(12) United States Patent
Sehr et al.

(10) Patent No.: US 9,197,446 B2
(45) Date of Patent: Nov. 24, 2015

(54) ADDRESS PINNING

(71) Applicant: Google Inc., Mountain View, CA (US)

(72) Inventors: David C. Sehr, Cupertino, CA (US);
Cliff L. Biffle, Berkeley, CA (US);
Bennet S. Yee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 13/712,675

(22) Filed: Dec. 12, 2012

(65) Prior Publication Data

US 2015/0195106 A1 Jul. 9, 2015

(51) Int. Cl.
*G06F 15/16* (2006.01)
*H04L 12/58* (2006.01)
*G06F 12/14* (2006.01)

(52) U.S. Cl.
CPC ........ *H04L 12/5845* (2013.01); *G06F 12/1458* (2013.01)

(58) Field of Classification Search
CPC .................................................. G06F 12/1458
USPC ....................................................... 709/206
See application file for complete search history.

(56) References Cited

U.S. PATENT DOCUMENTS

| | | | |
|---|---|---|---|
| 5,974,549 A * | 10/1999 | Golan | 726/23 |
| 7,636,800 B2 | 12/2009 | Ben-Yehuda et al. | |
| 8,234,407 B2 | 7/2012 | Sugumar et al. | |
| 2005/0246453 A1* | 11/2005 | Erlingsson et al. | 710/1 |
| 2005/0246718 A1* | 11/2005 | Erlingsson et al. | 719/317 |
| 2008/0016339 A1* | 1/2008 | Shukla | 713/164 |
| 2009/0282477 A1 | 11/2009 | Chen et al. | |
| 2010/0017461 A1 | 1/2010 | Kokkevis et al. | |
| 2010/0082926 A1* | 4/2010 | Sahita et al. | 711/163 |
| 2010/0138639 A1* | 6/2010 | Shah et al. | 712/227 |
| 2011/0029820 A1 | 2/2011 | Sehr et al. | |
| 2011/0047613 A1* | 2/2011 | Walsh | 726/16 |
| 2011/0145926 A1* | 6/2011 | Dalcher et al. | 726/26 |
| 2013/0145113 A1* | 6/2013 | Paperin et al. | 711/163 |
| 2013/0185764 A1* | 7/2013 | Krstic et al. | 726/2 |
| 2013/0185787 A1 | 7/2013 | Chen et al. | |
| 2014/0040576 A1* | 2/2014 | Cordero et al. | 711/162 |
| 2014/0130187 A1* | 5/2014 | Prashant et al. | 726/29 |

\* cited by examiner

*Primary Examiner* — Hamza Algibhah
(74) *Attorney, Agent, or Firm* — Fish & Richardson P.C.

(57) ABSTRACT

Methods, systems, and apparatus, including computer programs encoded on computer storage media, for memory address pinning. One of the methods includes loading a software module into a sandbox environment; receiving, a message from the software module to a recipient, the message includes a memory address; determining whether to pin the memory address; and passing the message to an address pinning unit which replaces at least a portion of the memory address with at least a portion of a specified replacement address, when it is determined to pin the memory address, and passes the modified message to be delivered to the recipient.

19 Claims, 5 Drawing Sheets

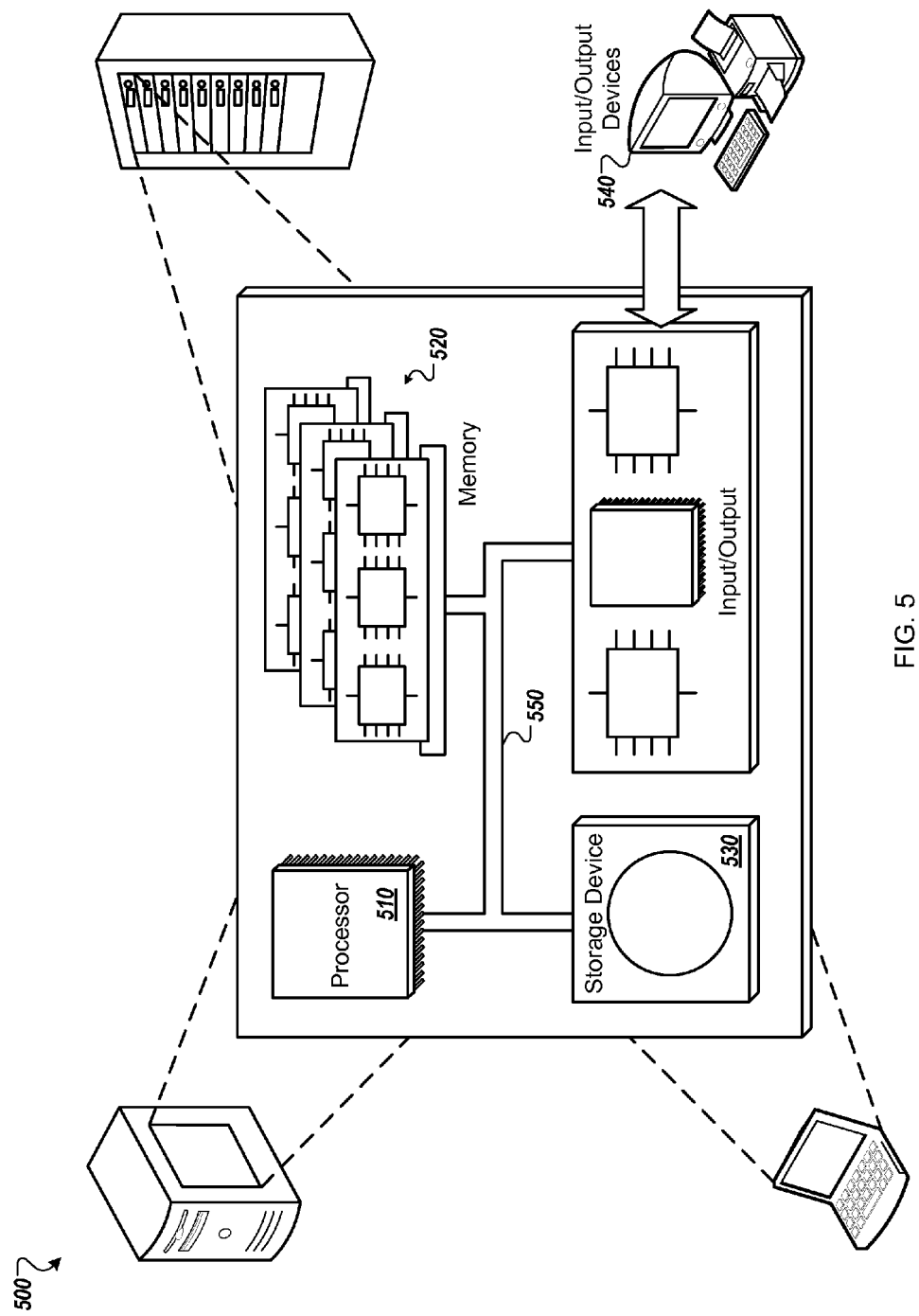

ADDRESS PINNING

BACKGROUND

This instant specification relates to memory address pinning.

In computing, a computer sandbox or sandbox environment is a mechanism often used for separating running programs. A conventional sandbox environment may limit, for example, a running program's impact on other programs, data stored by a computer system, or the computer system itself. Some sandbox environments are components of larger computer programs and may be used, for example, to contain plugins or scripted documents.

SUMMARY

To prevent hosted software from accessing memory outside of a permitted range, an address pinning may be used by a sandbox environment to pin memory addresses within specified bounds, e.g., using one or more address pinning units associated with a processor. The address pinning may be performed by replacing some of the bits of a memory address with predefined and stored bits. This effectively prevents a memory address from referencing a memory location outside of the range defined by the replacement bits. The address pinning can be controlled by a sandbox environment so that the sandbox environment may disable the address pinning when it is determined to pass a memory address that is to be unaltered. If the sandbox environment verifies that the software module does not attempt to call the address pinning functions, the sandbox environment may be run at the same permission level as the software module running within the sandbox environment.

In general, one innovative aspect of the subject matter described in this specification can be embodied in methods that include the actions of loading a software module into a sandbox environment; receiving, a message from the software module to a recipient, the message includes a memory address; determining whether to pin the memory address; and passing the message to an address pinning unit which replaces at least a portion of the memory address with at least a portion of a specified replacement address, when it is determined to pin the memory address, and passes the modified message to be delivered to the recipient. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining whether to pin the memory address includes determining that the message comprises an indirect control flow change. Determining whether to pin the memory address includes determining that the message comprises a data access message. The method further includes before receiving the message from the software module: receiving process control from the software module, disabling, responsive to receiving process control, address pinning, and passing, responsive to disabling the address pinning unit, the message to the recipient; and after the modified message is delivered to the recipient: enabling the address pinning, and passing, responsive to enabling the address pinning, process control to the software module. The method further includes determining that the address pinning is enabled, wherein when the address pinning is enabled the address pinning replaces at least a portion of the memory address with at least a portion of a specified replacement address. Loading the software module into the sandbox environment includes examining the software module to determine whether the software module includes instructions to configure the address pinning; and rejecting the second software module if the software module is determined to include instructions to configure the address pinning. The software module and the sandbox environment run at the same permission level.

In general, one innovative aspect of the subject matter described in this specification can be embodied in methods that include the actions of loading a software module into a sandbox environment; determining whether to pin a memory address of a message; receiving, by a hardware-based address pinning unit, the message from the software module to a recipient, the message includes a memory address; replacing, by the address pinning unit when it is determined to pin the memory address, at least a portion of the memory address with at least a portion of a pre-determined replacement address; and passing, by the address pinning unit, the modified message to be delivered to the recipient. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Determining whether to pin the memory address includes determining that the message comprises an indirect control flow change. Determining whether to pin the memory address includes determining that the message comprises a data access message. The method further includes prior to the address pinning unit receiving the message from the software module: receiving, at the sandbox environment, process control from the software module; disabling, responsive to receiving process control, the address pinning unit; and passing, responsive to disabling the address pinning unit, the message to the address pinning unit; and further including, after the modified message is delivered to the recipient: enabling the address pinning unit; and passing, responsive to enabling the address pinning unit, process control to the software module. The address pinning unit has a first register for specifying m number of high-order bits to be affected, a second register for specifying n number of low order bits to be affected, and a third register containing replacement bits. Replacing at least a portion of the memory address with at least a portion of a specified replacement address includes: replacing the m highest-order bits of the memory address with the m highest-order replacement bits; and replacing the n lowest-order bits of the memory address with the n lowest-order replacement bits. The method further includes determining, by the address pinning unit, that the address pinning unit is enabled; and wherein the address pinning unit replaces at least a portion of the memory address with at least a portion of a specified replacement address in response to determining that the address pinning unit is enabled. Loading the software module into the sandbox environment includes: examining the software module to determine whether the software module includes instructions to configure the address pinning unit; and rejecting the second software module if it is determined to include instructions to configure the address pinning unit. The software module and the sandbox environment run at the same permission level. The address pinning unit is a sub-component of a hardware processor. The address pinning unit is designated for data messages and the message from the software module is configured to access data at the memory address; and wherein the method further includes: receiving, by a second hardware-based address pinning unit, a second message from the software module to a second recipient, the message includes a request to pass control to instructions at a second memory address; replacing, by the second address pinning unit, at least a portion of the second memory address with at least a portion of a second specified replacement address; and passing, by the address pinning unit, the modified second message to be delivered to the second recipient.

The systems and techniques described here may provide one or more of the following advantages. If a sandbox environment verifies a software module, e.g., prior to execution, to determine that the software module does not include instructions to change the address pinning unit behavior, the sandbox environment may be run at the same permission level as the software module running within the sandbox environment. This can allow the sandbox environment to run at a permission level lower than an administrator level. Such a sandbox environment running at a lower permission level than administrator can provide robust software fault isolation without incurring the overhead of many conventional software fault isolation schemes. Validation can be simplified through software validation that does not rely on decoding register names and other instructions to determine whether sandbox enforcement instructions are needed.

The details of one or more implementations are set forth in the accompanying drawings and the description below. Other features and advantages will be apparent from the description and drawings, and from the claims.

BRIEF DESCRIPTION OF THE DRAWINGS

FIG. 5 is a schematic diagram that shows an example of a computing system that can be used in connection with computer-implemented methods and systems described in this document.

Like reference symbols in the various drawings indicate like elements.

DETAILED DESCRIPTION

Figure 1:
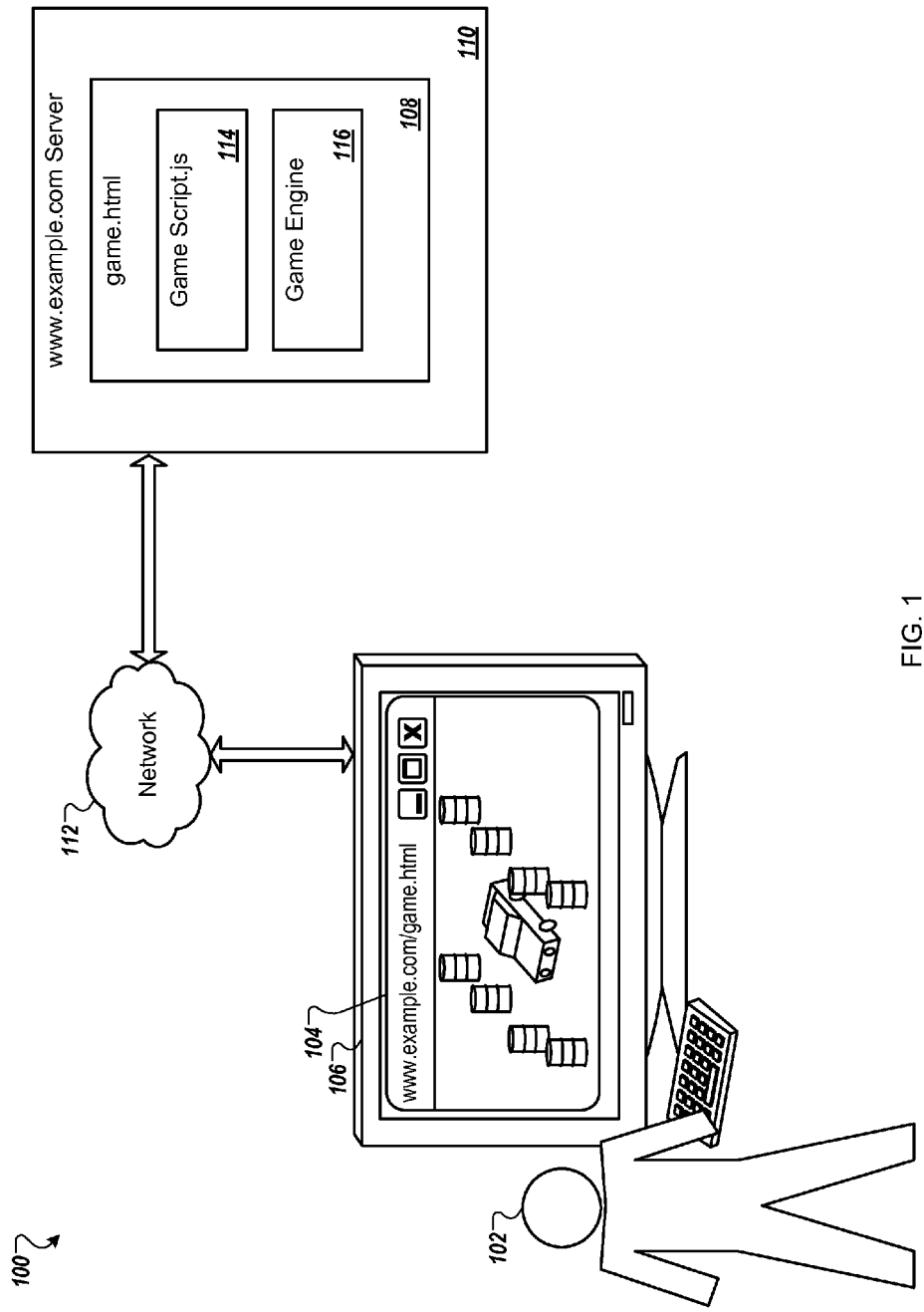
FIG. 1 is a diagram of an example system in which a game is served in a webpage.

FIG. 1 is a diagram of an example system 100 in which a game is served in a webpage. Here, a user 102 is accessing a webpage that has an embedded video game. The video game has a computationally complex three-dimensional (3D) world with moving elements that are rendered onto a two-dimensional (2D) viewing surface. To process the moving elements and the rendering, the video game has a game engine that runs native code on the user's computer, producing process throughput sufficient to play the game at a desirable speed and quality. To protect the computer from code that may be malicious or faulty, the computer can use address pinning to limit the native code's access to memory.

To load the game, the user 102 uses a web-browser 104 on a computer 106 to request a webpage 108 from a web server 110 over a network 112. In this example, the computer is a personal computer, e.g., a desktop computer or a laptop computer. However, it will be understood that any type of computer suitable to execute an application may be used in other example. These other computers include, but are not limited to, tablet devices, phones, televisions, game consoles, game cabinets, and kiosk machines.

At the user's direction, the web-browser 104 can request the webpage 108 from the web server 110. The request is passed over the network 112, which may include any suitable wired or wireless network such as a local area network (LAN), a wide area network (WAN) and the Internet. The web server 110 can respond to the request by sending a copy of the webpage 108 back to the web-browser 104 over the network 112.

The webpage 108 in this example is a hypertext markup language (HTML) document that includes at least a scripted module 114 and a native module 116. The HTML portions of the webpage 108 define many portions of the webpage, for example, the layout of elements in the webpage when it is displayed by a web-browser. One such element of the webpage 108 is a game created by the scripted module 114. The scripted module 114 in this example is a JavaScript program, although any appropriate scripting language that is interpreted by a web-browser may be used. The scripted module 114 can handle many of the functions of the game that are not computationally complex, such as user log in, input handling, and an in-game chat with other players.

More complex or time sensitive processes like rendering a 3D world and collision detection can be handled by a game engine created using the native module 116. In this example, the native module is written in C++, although any appropriate programming language that is executed by the web-browser may be used. The native module may be, or may include, off the shelf game engines and graphics libraries, e.g., id Tech 3 or Panda30 and OpenGL or Direct3D, respectively.

When the web-browser 104 receives the webpage 108, the web-browser displays the web-page 108. Displaying the web-page 108 can include one or more of rendering the HTML, interpreting the scripted module 114, or executing the native module 116. The web-browser 104 has a number of mechanisms to protect the computer 106 from any potential malicious or erroneous functionally of the web-page 108. For the HTML rendering, user-options may be set to restrict behavior that the user 102 may not want, e.g., storing cookies. For the script interpreting, the scripting language or interpreter may not support potentially dangerous functionality like reading or writing to a hard drive. For the native code execution, the web-browser 104 can execute the native module 116 in a sandbox.

A sandbox is a managed environment in which a subset of the computer's 106 resources are available and in which security measures ensure running code behaves in a desired way. For example, the sandbox may have access to only one directory of disk memory, a may restrict the native code's access to memory, and may only offer a subset of operating system or processor application programming interfaces (APIs). For example, the sandbox and processor of the computer 106 can have a memory pinning scheme under which the range of memory addresses available to the native code may be restricted.

The native module 116, and any other untrusted native code, can execute in the sandbox at, or near, the speed of native code executed outside of the sandbox. By executing the native module 116 in the sandbox, the browser can protect the rest of the computer 106 from untrusted native code without significantly diminishing the performance of the native module 116. As such, the developers of the game are able to embed games and other resources into webpages for display on a browser, and a user is able access the game without worrying that it will affect the user's computer.

Although a video game was used in this example, the system 100 can also be used for distributing other types of applications. Another example includes text-to-speech in which a scripted module sends page text to a native module and the native module generates a sound emulating a voice speaking the text, an embedded interpreter in which an arbitrary scripting language is used to create the scripted module and the native module is an interpreter for the arbitrary scripting language. Other uses include, but are not limited to, media players that are able to use hardware acceleration, remote desktop and virtualization services, computer aided drafting programs, and teleconferencing applications.

Figure 2:
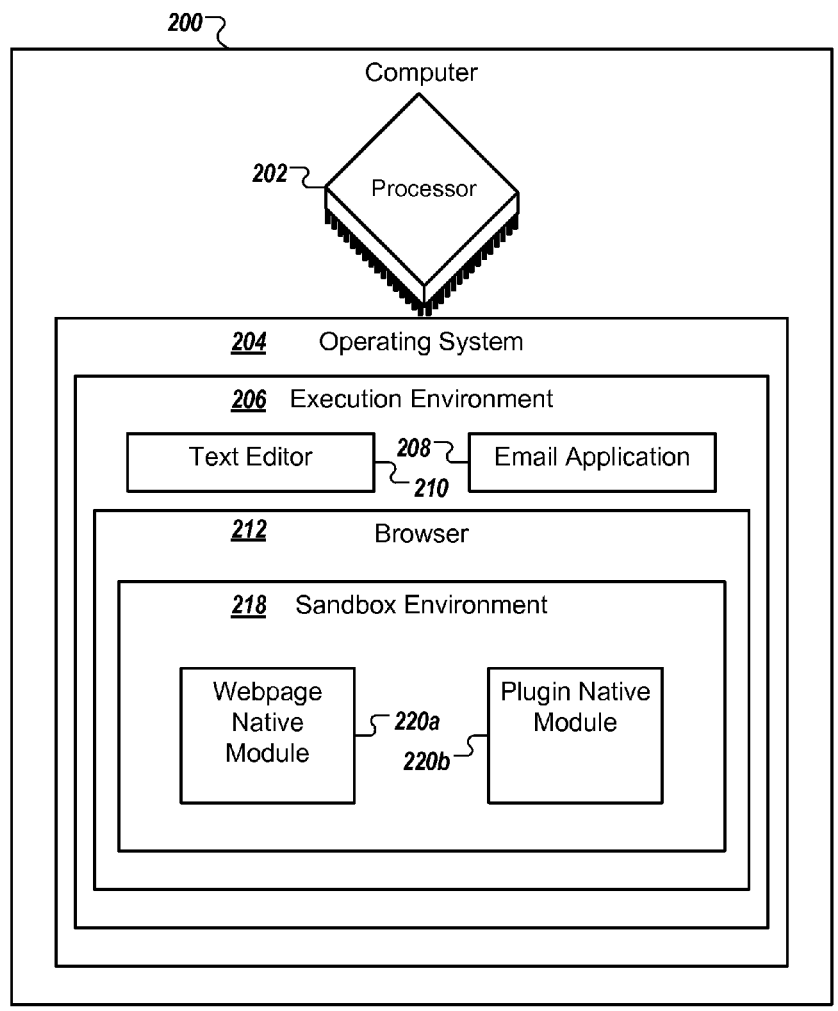
FIG. 2 is a diagram of an example computer system containing a browser with a native environment.

FIG. 2 is a diagram of an example computer system 200 containing a browser with a native environment. The computer system 200 may be used for, for example, downloading and displaying a webpage with a scripted module and a native module.

The computer system 200 includes hardware components including, but not limited to, a processor 202. The processor 202 can be configured to carry out instructions of computer programs and to perform arithmetic, logical, and input/output operations of the computer system 200. In some implementations, the processor is also able to alter memory address values according to one or more rules. For example, for security or other purposes, the processor 202 may pin some memory address values in some messages. Pinning, as used here, generally refers to limiting a memory address to a subset of all possible memory address values in some way. In some cases, pinning the memory involves overwriting some bits of a memory address with a predefined group of bits, including a sequence of bits entirely made of 0's or 1's. In some other cases, some portion of a memory address may be rounded. This rounding may be useful, for example, may include a fixed-sized bundle sandbox that that does not require CALL instructions to be bundle-end aligned and to round return address, or any other indirect control flow address.

Generally, address bits are pinned when the address values are used, e.g., with a control flow transfer instruction, or with a memory load or store instruction, as opposed to when address values are stored in memory. In some implementations, including those with the use of address pinning for load or store, the pinning may apply to either the final address value derived from the addressing mode used, or may apply to the intermediate values used in the address calculation (e.g., scale-index-base values for x86 instruction sets). The form of pinning may also depend on which intermediate value is involved, e.g., to limit the maximum index value allowed as well as to ensure that the final address is in a certain sandbox data range.

Other hardware components that may be included in the computer system 200 include, but are not limited to, main memory, disk memory, input/output hardware, and network connections (not shown for clarity). The hardware of the computer system 200 runs an operating system 204 that manages computer hardware resources and provides common services for application software. The operating system 204 may be a general purpose operating system that is compatible across a variety of hardware configurations, or the operating system 204 may be system-specific. Some of the tasks that the operating system 204 may be responsible for include, but are not limited to, user authentication, windowing, and managing network traffic.

The operating system 204 can create an execution environment 206 for executing one or more applications. The execution environment 206 can represent the conditions, policies, and tools that the operating system 204 provides to applications executing in the operating system 204. Although one execution environment 206 is shown, some computer systems 200 can create multiple execution environments 206. For example, a computer system 200 may have many users, and the computer system 200 can create an execution environment for each user. The execution environments 206 may not all be the same. For example, an execution environment 206 for an administrative user may have more permissions enabled than an execution environment 206 for a non-administrative user.

Applications that can execute in the execution environment 206 can include user-facing applications, for example, an email application 208, a text editor 210, and a browser 212. Other types of application that are not user-facing, e.g., utilities daemons, may also execute in the execution environment 206. The applications in the execution environment 206 can execute computer-specific commands. Computer-specific commands include any function, library, API, or other command that is compatible with the computer system 200, but that may not be compatible with other computer systems.

One type of computer-specific command is a processor-specific command. Processor-specific commands are commands that are associated with one or more processors. Often, the processor-specific commands are part of an instruction set associated with a processor architecture, though not always. One group of processor-specific instructions is the x86 family of instruction sets. Example processor-specific instruction in the x86 family of instruction sets include AND for a logical "and" operation, CBW for converting a byte to a word, STI for setting an interrupt flag, and SUB for subtraction. Other example processor instruction sets include the ARM instruction set and the PowerPC instruction set.

Another type of computer-specific command is an operating system-specific command. Operating system-specific commands are commands that are associated with one or more operating systems. Operating system-specific commands are often organized into APIs related to a particular concept or task. For example, some Unix-based operating systems include an API for sockets and another API for shared memory management. Other operating system-specific commands include files and features often or always found in an operating system. For example, the /dev/random file in some Unix-based operating systems servers as a pseudorandom number generator.

Other types of computer-specific commands can exist. For example, a hardware device connected to the computer system 200 may have associated commands. The complete set of all computer-specific commands available in the execution environment can include processor-specific commands, operating system-specific commands, and other commands. The number and type of processor-specific commands may depend on the configuration of the computer system 200, as well as other factors.

A shown in FIG. 2, the browser 212 executes in the execution environment 206 and may access some or all of the computer-specific commands of the execution environment 206. The browser 212 can load and display documents, e.g., files or other resources, to a user. In doing so, the browser 212 may need to render, interpret, and/or execute portions of the documents. Examples of the browser 212 include, but are not limited to, file browsers, document editors, and web-browsers.

The browser 212 can also create a sandbox environment 218 for executing received native modules 220. The native modules 220 may come from a variety of sources. For example, native module 220a may be component of a document being loaded and displayed by the browser 212 and native module 220b may be a plugin of the browser 212. Native modules, as the term is used here, may refer at least to modules that can be configured to execute computer-specific commands. The native modules 220 may, for example, be written in a computer-specific programming language such as C or C++ and may contain binary data created by compiling the source code into computer-specific commands. In other examples, a just in time (JIT) compiler or dynamic binary translator may compile from an intermediate representation (e.g. bytecode).

The sandbox environment 218 may be an environment that is similar to an execution environment 206 that limits the types of computer-specific commands and/or command parameters that are permitted. For example, the sandbox environment 218 may intercept the commands and messages of the native modules 220 and alter or prevent some of the commands and messages. One technique that can be used by the sandbox environment 218 for controlling a native module 220 includes restricting the native module 220 to specific sub-ranges of memory. This limitation may apply to memory accesses for data access, control flow, and/or for any other memory access by the native module 220. In this way, the native module 220 may be prevented from maliciously or erroneously affecting memory used by another process of the system 200. To prevent the native modules 220 from accessing memory outside of the appropriate range, the sandbox environment 218 may intercept messages to and from the native modules 220 and replace memory address values with other values.

For example, the processor 202 may store one or more bits that constitute a portion of a memory address. When the sandbox environment 218 intercepts a message with a memory address, the sandbox environment 218 can pass that message or memory address to the processor 202. The processor 202 may then overwrite part of the memory address with the stored bits. In this way, a memory address in a command or message generated by a native module 220 can be bounds limited by the processor 202.

In some implementations, a white list of permitted commands and messages is established for a sandbox environment 218 and only those commands and messages are permitted. In some implementations, a black list of restricted commands and messages is established for the sandbox environment 218 and those commands are denied. Other configurations of the native environment are possible. For example, the sandbox environment 218 may prevent cross-process messaging and may isolate software faults.

In some implementations, the sandbox environment 218 performs one or more actions when loading the native modules 220. These actions may ensure, for example, that the native modules 220 conform to certain heuristics, do not include forbidden functionality, or may extract information from the native modules 220. One type of functionality that may be forbidden is function calls to the processor 202 that enable or disable address pinning. The processor 202, or any address pinning system, may include functions to, for example, enable, disable, or change address pinning behavior. If the sandbox environment 218 successfully screens for native modules 220, the sandbox environment 218 and the native modules 220 may both run at the same permission levels. For a screening to be successful, the sandbox environment 218 can examine the native module 220 to determine if the native module 220 includes any of the function calls disabling address pinning. If those function calls are not found in the screening, the sandbox environment 218 can load and run the native code 220 while maintaining encapsulation of the native modules 220.

When the native module 220 is run and generates a message with a reference to a memory address, the sandbox environment 218 can intercept that message. If the sandbox environment 218 determines that the memory address in the message should be pinned, the sandbox environment 218 can provide the message to the processor 202 without disabling pinning. If the sandbox environment 218 determines that the memory address in the message should not be pinned, the sandbox environment 218 can take the following actions upon receipt of the message and process control from the native module 220.

The sandbox environment 218 can call a function to disable address pinning in the processor 202. Once the pinning has been disabled, the sandbox environment passes the message containing the memory address to the processor 202. Then, the sandbox environment 218 can enable pinning in the processor 202 and pass process control back to the native module 220 once the pinning is enabled. These steps may remain secure because, to have a message pass out of the sandbox 218 without pinning, the native module 220 has to give up process control and may be unable to execute while the pinning is disabled by the sandbox 218.

The sandbox 218 may permit unpinned memory address in messages from the native module 220 for various reasons. For example, the security policies of the sandbox environment 218 may permit any loaded native module 220 to send an email message to a remote address. The sandbox environment 218 examine a message from a native module 220 to an email program at a memory address, e.g. using a dynamically bound pointer, and determine that it is a permitted message that does not need to be pinned, according to the sandbox environment's 218 security policy.

While the example shown involves a sandbox environment as an element of a browser, any type of sandbox environment may be used. For example, a stand-alone virtual machine may have a similar configuration to handle applications distributed through other channels. A sandbox environment may be the only execution environment available to user-level applications so that every application a user loads and runs is subject to sandbox environmental management.

Figure 3:
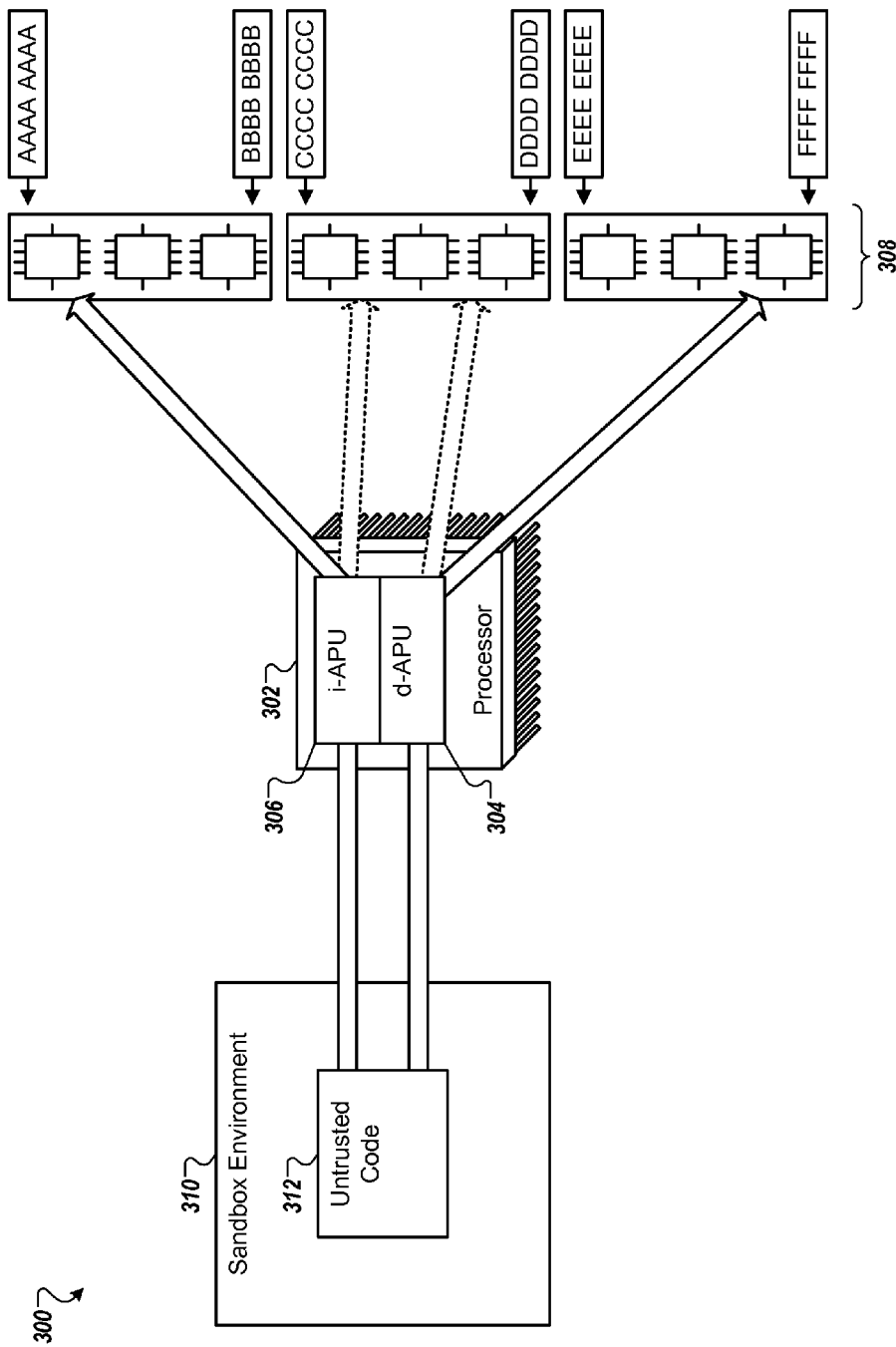
FIG. 3 is a diagram of an example system with a processor having two address pinning units.

FIG. 3 is a diagram of an example system 300 with a processor having two address pinning units (APUs). Generally speaking, an APU may be a sub-component of a computer chip, other hardware, firmware, or software that is configurable to pin a memory address.

A processor 302, e.g., a central processing unit, graphics processing unit, includes two APUs 304 and 306. In this example, the APU 304 is dedicated for use in pinning addresses to memory that is used for data storage and the APU 306 is dedicated for use in pinning address to memory that contains instructions of computer code. As such, the APU 304 will be referred to as the d-APU 304 and the APU 306 will be referred to as the i-APU 306. This configuration may be desirable, for example, if the memories for data storage and for instructions are distinct and not adjacent. Additionally, some uses of the system 300 might include parallelized processes that share data storage memory, but that should not be allowed to access instructions of other processes. This configuration allows such processes to share a single d-APU 304 without sharing a single i-APU 306.

Although the i-APU 306 and the d-APU 304 are shown as subcomponents of the process 302, other configurations are possible. For example, many general purpose processors include a memory management unit (MMU). Additionally, a chipset can provide final address generation, and therefore may contain a d-APU 304. The d-APU 304 may reside, in other configurations, in the chipset or in memory itself. The i-APU 306 may be located, for example, in a register update unit in order to facilitate least significant bit pinning. In these cases, attempts to change an instruction pointer register value using indirect control flow transfers would automatically get low-order bits cleared. Most significant bits could also be pinned by the i-APU 306 if located in the register update unit. Another possible location for the i-APU 306 is in the path from the instruction fetch unit to the memory (or caches, etc.). This may permit the instruction pointer register value to be different and high order bits could, for example, be used to encode other information while the actual memory location from which instructions are fetched will have the corresponding most significant bits pinned. Similarly, the d-APU 306 may be located, for example, in the path from the instruction fetch unit to the memory, in one or more caches, etc.

The APUs 304 and 306 can be configured to restrict untrusted code to memory addresses that range, as schematically shown, from address CCCC CCCC to DDDD DDDD. For clarity, in this example, the boundary between instruction-holding memory and data-holding memory is not shown. When the APUs 304 and 306 are enabled, memory addresses outside of the designated range, as schematically shown with solid arrows, may be pinned to memory addresses within the permitted range of CCCC CCCC to DDDD DDDD, as schematically shown with dotted line arrows. In some implementations, the permitted range of memory address is of a size that is a power-of-two. This power-of-two sized range may match with a power-of-two sized boundary of the memory, as schematically shown by the boundary between memory device icons 308. This power-of-two range may be the result of the way that memory addresses are pinned. For example, if each bit in the memory address represents a power-of-two memory range, as is the case in binary addressing, each bit that is not replaced by an APUs 304 and 306 results in a power-of-two size address space.

A sandbox environment 310 can load untrusted code 312 that is to be run within the sandbox environment 310. The untrusted code 312 may be native code such as the native module 220, interpreted code, or any other appropriate code that includes instructions to read and write data to memory 308 and/or to pass process control to an instruction that is stored in memory 308. Untrusted code 312 may include, but is not limited to, code of an unknown origin or behavior that may or may not harm a computing environment. The untrusted code 312 can include, for example, code received from an unknown publisher, code that has exhibited virus-like behavior, or code to be run in a sensitive hardware environment.

The sandbox environment 310 may run at a particular permission level. In this example, a user permission level will be discussed, but it will be understood that in some configurations, other permission levels may be used. The sandbox environment 310 may be a sub-component of a larger software package, may be a standalone application, or may be an element of an operating system.

Before or as part of the loading of the untrusted code 312, the sandbox environment 310, or other appropriate component can validate the untrusted code, in part by examining the untrusted code to determine if the untrusted code 312 includes any forbidden functionality. This forbidden functionality can include calls or attempts to access the functionality of APUs 304 and 306, including but not limited to attempts to enable, disable, or bypass an APU.

If the code does call one of the functions of the APUs 304 and 306, the sandbox environment 310 can reject the untrusted code 312. That is, the sandbox environment 310 can fail to or refuse to load the untrusted code 312.

If the untrusted code 312 is successfully loaded, the untrusted code 312 is run in the sandbox 310, optionally at the same permission level as the sandbox 310. Running the untrusted code 312 at the same permission level may be considered safe in some cases because the untrusted code 312 has been verified to not include functions, e.g., calls to the APUs 304 and 306, known to be useful for escaping the sandbox environment 310.

During execution of the untrusted code 312, calls to memory locations are passed from the untrusted code 312 to the sandbox 310, and process control is also passed from the untrusted code 312 to the sandbox environment 310. The sandbox environment 310 may then pass the calls to the appropriate APU 304 or 306. If the APU 304 or 306 is enabled, as may be typical under normal operations of the sandbox environment 310, the APU 304 or 306 pins the memory address and passes the message to the intended recipient. The pinning can include limiting the possible address space by, for example, ignoring some bits of a memory address and replacing them with predefined bits. In some implementations, APUs 304 and 306 store and replace m high bits and n low bits, and/or some bits at predefined indexes of the memory address. The APUs 304 and 306 can store and replace bits at the same indexes of memory addresses, or can store and replace bits at different indexes.

The structure of the APUs 304 and 306 generally includes support for decoding logic to recognize the APU control instructions. This logic may be substantially similar to decoding logic to recognize various other control instructions. The APUs 304 and 306 may be realized with register to hold pinned bit values, a multiplexer (MUX) that either passes the computed address to update the architectural program count register or to replace the computed address with the pinned address bit values from the register. The MUX may be configured to switch to the pinned values activated when: i) the execution unit recognizes that the instructions being executed is an indirect control flow instruction, and ii) when the APUs 304 or 306 sandbox mode is activated.

In these scenarios, the sandbox environment 310 may expose a particular interface, function, or setting that the untrusted code 312 can use to send messages out of the sandbox environment 310 and out of the pinned range of memory 308. The sandbox environment 310 may examine these messages and, if permitted, e.g., by the sandbox environment's 310 security policy, the sandbox environment 310 can call a function to disable the appropriate APU 304 or 306. The sandbox environment 310 can then send that message to the disabled APU 304 or 306, where the message will not be pinned, and the APU 304 or 306 may pass the unpinned message on to the intended recipient. Once sent, the sandbox 310 may then call a function to re-enable the APU 304 or 306.

To facilitate these actions, some implementations of the APUs 304 and 306 each contain logical registers accessible to user code, e.g., the sandbox environment 310 and the untrusted code 312, though the untrusted code 312 may be verified to not actually access the logical registers. For instruction address pinning e.g., by i-APU 306, these registers may be called IAPU_PINNED_MSBS to hold the number of high-order bits that an APU will affect, IAPU_PINNED_LSBS to hold the number of low-order bits that the APU will affect, and IAPU_REPLACEMENT, an address-sized register to contain the replacement bits the APU will apply. For data address pinning, e.g., by d-APU 304, registers may include DAPU_PINNED_DATA_ADDR_MSBS and DAPU_PINNED_DATA_ADDR_REPLACEMENT, which do not change the low order bits. To enable or disable address pinning, the APUs 304 and 306 may expose a SANDBOX_ON and a SANDBOX_OFF command to user code, e.g., the sandbox environment 310 and the untrusted code 312, though the untrusted code 312 may be verified to not actually access the operations. Additionally, by having address bits pinning for data accesses, the need to explicitly insert data sandboxing sequences can be removed. Although two APUs 304 and 306 of a single processor 302 are shown in this example, other configurations are possible. For example, a single processor may have more or fewer APUs; the APUs may not be designated for these or any particular purpose; the system 300 may have multiple processors, each with more, fewer, or no APUs; and/or the APUs may be functional components, e.g., a library or interface with no physical hardware specifically for address pinning.

The APUs 304 and 306 may be configured to function differently. In one case, the i-APU 306 may be configured to always pin some bits, for example, a number of high order bits. Additionally, the i-APU can pin a number of low order bits under particular circumstances. For example, the i-APU can pin a number of low order bits if, and only if, the address is about to be stored into the architectural instruction pointer (program counter) as a result of an indirect control flow transfer. That is, an instruction address may be restricted to a 0 mod 32 for indirect control flow transfers such as returns and indirect jumps or calls, but normal usage e.g., fetching the next instruction, may be unaffected.

Figure 4:
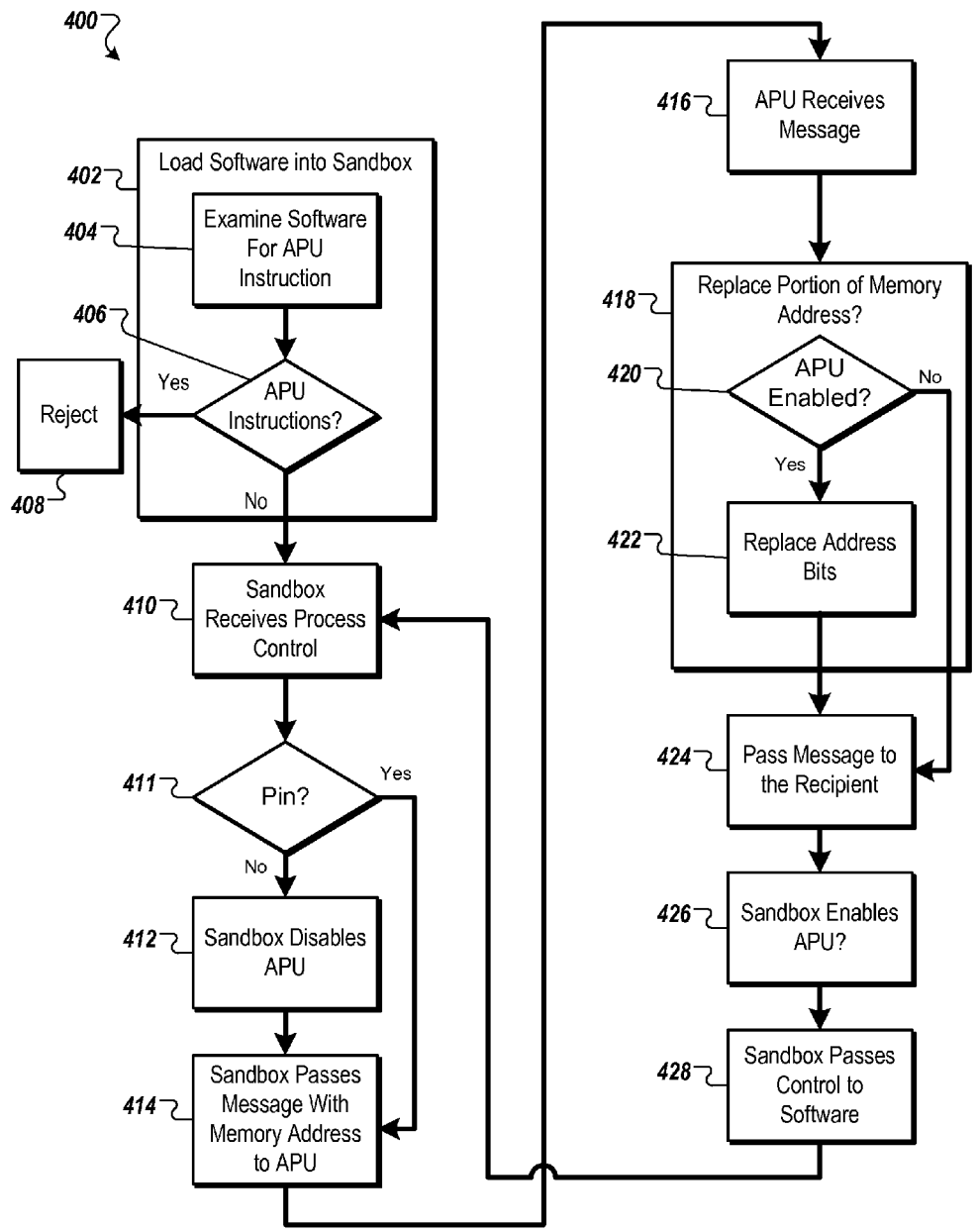
FIG. 4 is a flowchart of an example process for running computer code with a processor having at least one pinning unit.

FIG. 4 is a flowchart of an example process for running computer code with a processor having at least one pinning unit. For convenience and clarity, the process 400 will be described as being performed by a system including one or more computing devices, for example the system 300. Therefore, the description that follows uses the system 300 as the basis of an example describing the system for clarity of presentation. However, another system, or combination of systems, can be used to perform the process.

A software module can be loaded (402) into a sandbox environment. For example, the sandbox environment (e.g., sandbox environment 310) may be directed by user input to load a software module (e.g., untrusted code 312), or the sandbox environment may detect the presence of software module and automatically load the software module in response. In some implementations, the software module and the sandbox environment runs at the same permission level. For example, if the software module is a user level application, both the sandbox and the software module by run at user level permissions. If the software module is, for example, an administration application, the sandbox environment and the software module may both run at the same administrator permission level.

Loading the software module into the sandbox environment can include examining (404) the software module to determine that the software module does not include instructions to configure an APU. For example, the sandbox environment may use one or more processor APUs (e.g., APUs 304 and/or 306). The sandbox environment can examine the contents of the software module to determine if software module includes instructions to control the APU. If the software module contains instructions to configure the APU (406), the software module may be rejected (408). For example, the presence of calls to an APU by a software module may indicate that that software module is able to escape from the sandbox environment, e.g., by accessing memory outside of a region specified by the sandbox. Additionally or alternatively, the presence of these instructions may also indicate a software module that is malicious or does not conform to the published specification of the sandbox environment's security model.

If the software module does not contain instructions to configure the APU (406), the sandbox environment can load the software module and when the software module is executed receive (410) process control from the software module assuming no other instructions would prohibit execution. Even though the software module may not contain instructions to configure the APU, the validator may determine that the software module should not be run based on other banned instructions, for example, system call trap requests.

If no other banned instructions are found, the sandbox environment may initiate execution, interpretation, or otherwise run the software module within the sandbox environment. While the software module runs, it may be free to access the limited environmental features and functions of the sandbox environment. For example, this may include, but is not limited to, user input and output, limited or full disk access, managed garbage collection, etc. In some cases, the validator can ensure that APU manipulations done by the software module are stricter than those done by the sandbox. For example, if the native module tries to configure the APU to use only 256 MB of memory, where the sandbox would permit 1 GB, the restrictions native module may be permitted.

The sandbox environment can determine (411) if a memory address requires memory address pinning and can disable (412) the APU responsive to receiving the process control if it does not. In some cases, the sandbox environment may determine that the memory address requires memory address pinning if it is part of an indirect control flow change, as opposed to a direct control flow change. Additionally or alternatively, the sandbox environment may determine that the memory address requires memory address pinning if it is a data access message.

For example, at a point during execution of the software module, the untrusted code may request permission to pass a message that includes a memory address. For example, the message may be from the software module and to a recipient. If the software module passes the message through the correct channel, for example, an interface of the sandbox environment for such requests, the sandbox environment examines the message and determines if the message should be permitted. If the message should be allowed without pinning, the sandbox environment can call a command of the APU to disable the APU. If the memory address should not be allowed to pass without pinning, or if the software module sends the message through a different channel, the sandbox environment does not disable the APU.

The sandbox environment can pass (414) the message to the APU and the APU can receive (416) the message. For example, the sandbox environment may select the correct APU from a collection of APUs based on, for example, the memory address within the message or the type of message. Once selected, the sandbox environment may pass the message to that APU. The APU can replace (418) at least a portion of the memory address with at least a portion of a specified replacement address depending on whether or not the APU is enable (420). For example, he APU can have a first register for specifying m number of high-order bits to be affected, a second register for specifying n number of low-order bits to be affected, and a third register containing replacement bits.

In one example, an APU for data access (e.g., APU 304) may be configured to limit loads and stores to the software module's virtual address chunk. In this case, that APU's APU_LSBS register may be set to zero, allowing any central processing unit (CPU)-supported alignment. The APU's APU_MSBS may be set to the system's address size minus log 2 of the software module's virtual address chunk size. The APU's APU_REPLACEMENT may be set to the software module's virtual base address.

In another example, an APU for control (e.g. APU 306) may be configured both to limit branch range, and to ensure target alignment. In this example, the software module uses a regular bundle structure where every 2^nth byte is a valid jump target. In this configuration, n=5, the APU_LSBS is set to 5, APU_MSBS may be set to the system's address size minus log 2 of the software module's virtual address chunk size, and APU_REPLACEMENT may be set to the software module's virtual base address.

In some implementations, the APU can check to ensure that pinned address bits have been properly pinned. In some cases, for forward compatibility, some hardware designers typically require a hardware trap for "unused" bits, to prevent software designers from using such bits to hold ancillary information such as type tags (e.g., in Lisp implementations). Such uses may be harmless in current implementations of the hardware, but interfere with future extensions (e.g., ARM vs. THUMB mode with the low order bits for control flow transfers, or increasing the maximum physical/virtual addresses permitted with hardware for memory references).

If the APU is determined (420) to be enabled the APU may replace (422) a portion of the message's memory address with stored bits. In some implementations, the APU may replace the m highest bits with the contents of the first register and the n lowest bits with the contents of the second register.

The APU can pass (424) the message, e.g., as modified by the APU, to the recipient. For example, if the message recipient is a MMU, the APU can pass the modified message to the MMU. Other recipients might include branch predictors, virtually addressed caches, and/or prefetch units.

By contrast, if it is determined (420) that the APU is not enabled, the APU passes (424) the message to the recipient without modification.

The sandbox can then enable (426) the APU and pass (428) control back to the software module. For example, by enabling the APU and passing control back to the software module, the sandbox environment may restore the system to the original configuration in which the APU pins messages from the software module.

FIG. 5 is a schematic diagram that shows an example of a computing system 500. The computing system 500 can be used for some or all of the operations described previously, according to some implementations. The computing system 500 includes a processor 510, a memory 520, a storage device 530, and an input/output device 540. Each of the processor 510, the memory 520, the storage device 530, and the input/output device 540 are interconnected using a system bus 550.

The processor 510 is capable of processing instructions for execution within the computing system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the computing system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the computing system 500. In some implementations, the storage device 530 is a computer-readable medium. In various different implementations, the storage device 530 may be a floppy disk device, a hard disk device, an optical disk device, or a tape device.

The input/output device 540 provides input/output operations for the computing system 500. In some implementations, the input/output device 540 includes a keyboard and/or pointing device. In some implementations, the input/output device 540 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices;

magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

What is claimed is:

1. A method comprising:
    loading a software module into a sandbox environment;
    receiving, a message from the software module to a recipient, the message includes a memory address;
    determining whether to pin the memory address, where pinning comprises limiting the memory address to a subset of all memory address values; and
    passing the message to an address pinning unit which replaces at least a portion of the memory address with at least a portion of a specified replacement address, when it is determined to pin the memory address, and passes the modified message to be delivered to the recipient.

2. The method of claim 1, wherein determining whether to pin the memory address comprises determining that the message comprises an indirect control flow change.

3. The method of claim 1, wherein determining whether to pin the memory address comprises determining that the message comprises a data access message.

4. The method of claim 1, the method further comprising:
    before receiving the message from the software module:
       receiving process control from the software module,
       disabling, responsive to receiving process control, address pinning, and
       passing, responsive to disabling the address pinning unit, the message to the recipient; and
    after the modified message is delivered to the recipient:
       enabling the address pinning, and
       passing, responsive to enabling the address pinning, process control to the software module.

5. The method of claim 1, wherein the method further comprises:
    determining that the address pinning is enabled, wherein when the address pinning is enabled the address pinning replaces at least a portion of the memory address with at least a portion of a specified replacement address.

6. The method of claim 1, wherein loading the software module into the sandbox environment comprises:
    examining the software module to determine whether the software module includes instructions to configure the address pinning; and
    rejecting the second software module if the software module is determined to include instructions to configure the address pinning.

7. The method of claim 1, wherein the software module and the sandbox environment run at the same permission level.

8. A method comprising:
    loading a software module into a sandbox environment;
    determining whether to pin a memory address of a message, where pinning comprises limiting the memory address to a subset of all memory address values;
    receiving, by a hardware-based address pinning unit, the message from the software module to a recipient, the message includes a memory address;
    replacing, by the address pinning unit when it is determined to pin the memory address, at least a portion of the memory address with at least a portion of a pre-determined replacement address; and
    passing, by the address pinning unit, the modified message to be delivered to the recipient.

9. The method of claim 8, wherein determining whether to pin the memory address comprises determining that the message comprises an indirect control flow change.

10. The method of claim 8, wherein determining whether to pin the memory address comprises determining that the message comprises a data access message.

11. The method of claim 8, further comprising, prior to the address pinning unit receiving the message from the software module:
    receiving, at the sandbox environment, process control from the software module;
    disabling, responsive to receiving process control, the address pinning unit; and
    passing, responsive to disabling the address pinning unit, the message to the address pinning unit; and
    further comprising, after the modified message is delivered to the recipient:
    enabling the address pinning unit; and
    passing, responsive to enabling the address pinning unit, process control to the software module.

12. The method of claim 8, wherein the address pinning unit has a first register for specifying m number of high-order bits to be affected, a second register for specifying n number of low-order bits to be affected, and a third register containing replacement bits.

13. The method of claim 12, wherein replacing at least a portion of the memory address with at least a portion of a specified replacement address comprises:
    replacing the m highest-order bits of the memory address with the m highest-order replacement bits; and
    replacing the n lowest-order bits of the memory address with the n lowest-order replacement bits.

14. The method of claim 8, wherein the method further comprises:
    determining, by the address pinning unit, that the address pinning unit is enabled; and
    wherein the address pinning unit replaces at least a portion of the memory address with at least a portion of a specified replacement address in response to determining that the address pinning unit is enabled.

15. The method of claim 8, wherein loading the software module into the sandbox environment comprises:

examining the software module to determine whether the software module includes instructions to configure the address pinning unit; and rejecting the second software module if it is determined to include instructions to configure the address pinning unit.

16. The method of claim 8, wherein the software module and the sandbox environment run at the same permission level.

17. The method of claim 8, wherein the address pinning unit is a sub-component of a hardware processor.

18. The method of claim 8, wherein the address pinning unit is designated for data messages and the message from the software module is configured to access data at the memory address; and wherein the method further comprises:
receiving, by a second hardware-based address pinning unit, a second message from the software module to a second recipient, the message includes a request to pass control to instructions at a second memory address;

replacing, by the second address pinning unit, at least a portion of the second memory address with at least a portion of a second specified replacement address; and passing, by the address pinning unit, the modified second message to be delivered to the second recipient.

19. A system comprising:

a computer configured to perform operations comprising:
loading a software module into a sandbox environment;
receiving, a message from the software module to a recipient, the message includes a memory address;
determining whether to pin the memory address, where pinning comprises limiting the memory address to a subset of all memory address values; and
passing the message to an address pinning unit which replaces at least a portion of the memory address with at least a portion of a specified replacement address, when it is determined to pin the memory address, and passes the modified message to be delivered to the recipient.

* * * * *